Nov. 5, 1963 H. M. FREDERICK 3,109,924

RECORD HANDLING AND READING APPARATUS

Original Filed Dec. 31, 1958

INVENTOR.
HAROLD M. FREDERICK

BY William R. Nolte

AGENT 3,109,924

RECORD HANDLING AND READING APPARATUS

Harold M. Frederick, Birmingham, Mich., assignor to Burroughs Corporation, Detroit, Mich., a corporation of Michigan Continuation of application Ser. No. 784,284, Dec. 31, 1958. This application Mar. 12, 1962, Ser. No. 186,571
15 Claims. (Cl. 235—61.11)

The present invention relates to apparatus for handling and reading documents in the form of bank checks, cards or the like bearing indicia thereon to be automatically sensed. This application is a continuation of application Serial No. 784,284, filed December 31, 1958, now abandoned, in the name of Harold M. Frederick, entitled "Record Handling and Reading Apparatus."

Although of broader applicability the present invention is particularly suitable for use in automatic high speed sorters for documents, such as bank checks or the like, bearing indicia in the form of characters capable of being read by a sensing element or signal transducing device. Based on the information read from the documents, the invention may be utilized to control a chute selection mechanism of the sorter to direct the documents into stacker pockets, the particular pocket for each document being determined by the information read. It is understood, of course, that other uses may be made of the information read from the document.

For efficient operation of such a machine it is desirable to move the documents at high rates of speed and at the same time obtain signals of sufficient clarity and strength for discriminating between the different characters sensed. In the reading of documents which are transported at high speeds, particularly thin flexible sheet items such as bank checks, bearing characters to be automatically sensed, it is necessary to bring such items into very close proximity to a character sensing head. The invention herein disclosed relates to improved apparatus which provided the desired results with economy of structure and without damage to the documents even though transported at high rates of speed.

The present invention has as its principal object the provision of improved apparatus whereby character images on a sheet item can be read while moving at high speeds.

In accordance with the above object and first briefly described, the invention comprises apparatus for moving a document with readable characters or indicia at high speed past a sensing element for reading the indicia, while simultaneously maintaining the moving document in close relationship with the sensing element as it moves through the apparatus.

Other objects of the invention will appear from the following description, reference being made to the drawing in which.

Figures 1, 2, 3, 4, 5:
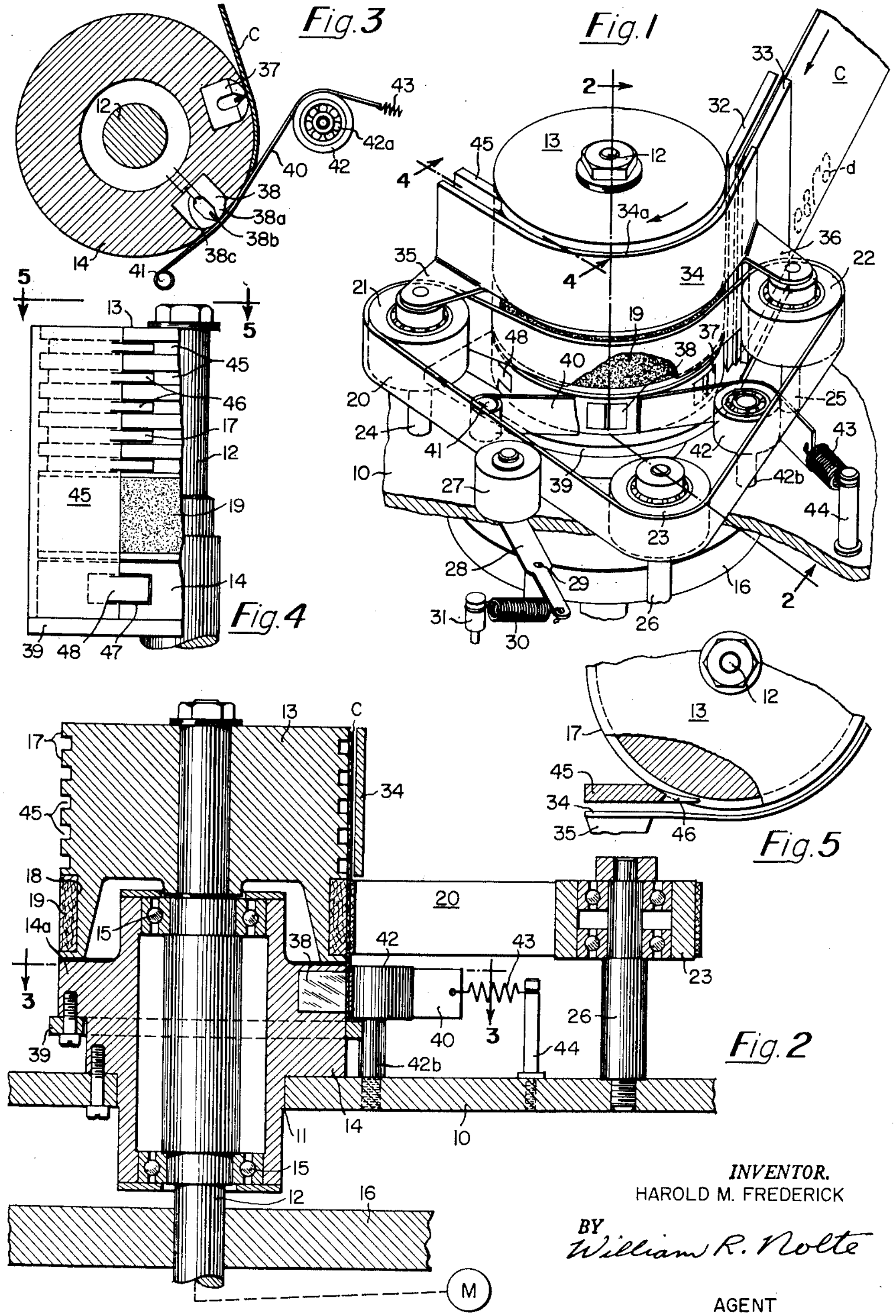
FIGURE 1 is a perspective view of apparatus embodying the invention.
FIGURE 2 is a sectional view taken along the line 2—2 of FIG. 1.
FIGURE 3 is a sectional view taken along the line 3—3 of FIG. 2.
FIGURE 4 is a sectional view taken along the line 4—4 of FIG. 1.
FIGURE 5 is a fragmentary plan view partially in section and looking in the direction of the arrows on the line 5—5 of FIG. 4.

In the illustrated embodiment of the invention as briefly described, there is provided a constantly rotating drum which cooperates with associated elements to partially wrap a document such as a bank check therearound while simultaneously driving the same forwardly at high speeds. Also associated with the rotatable drum is a stationary part having a curved surface corresponding to the radius of curvature of the drum surface and concentric therewith. Carried within the stationary part and flush with the curved surface thereof is a magnetizing head and a magnetic reading head, the two heads being peripherally spaced apart from each other. A flexible band of electrically non-magnetic material is supported under tension so that it conforms to the curvature of the part of the drum in which the reading head is mounted and is adapted to permit the passage of sheet items therebetween. One of the elements cooperating with the drum to grip the checks is a movable belt which together with the rotatable drum grips the leading edge of each check to tightly wrap it around the stationary part while the check is simultaneously pulled forward under tension between the stationary part and the band. The indicia along the marginal edge of each check is first energized by the magnetizing head while the pressure applied radially to the back of the check by the flexible band urges the ferromagnetic indicia thereon into close proximity to the reading head. Means are provided to facilitate stripping of the checks from the drum without damage as they leave the drum at high speeds.

More specifically, as hereinafter described, and as illustrated in the accompanying drawings, the preferred embodiment of the invention constitutes a component of a check sorting machine which is not shown, for sequentially reading documents, such as bank checks, one of which is shown at C, each bearing ferromagnetic indicia along its marginal edge as at *d*. As seen in FIG. 1, a check C which has been previously set into motion by the check sorting machine is shown entering the reading device in the direction indicated by the arrow thereon.

A base member or frame plate 10, FIG. 2, apertured as at 11 has projecting therethrough a shaft 12 to which is fixed at its upper end a rotatable drum 13. Associated with the drum is a stationary portion 14 having a surface of the same radius as the rotatable drum and concentric therewith. The stationary portion comprises a hollow drum which is suitably fixed to frame plate 10, and in which shaft 12 is journalled as by bearings 15. A source of power, diagrammatically illustrated at M, is supplied to rotate shaft 12 and drum 13 at a high constant speed in the direction indicated by the arrow on the drum in FIG. 1. A large flywheel 16 affixed to the lower end of shaft 12 and spaced from frame plate 10 is provided to assure that the drum is rotated at a constant rate of speed in the event of current fluctuation to the power source.

The upper portion of rotatable drum 13 includes a plurality of annular flange portions or ribs 17 while the lower portion thereof is annularly recessed as at 18 to receive a tire 19 having a high coefficient of friction and which is of the same external diameter as the annular flanges 17. As best seen in FIG. 1, there is provided an endless fabric belt 20 which in the presently illustrated embodiment of the invention is passed around three idler pulleys 21, 22 and 23 suitably mounted in frame plate 10 by means of posts 24, 25 and 26 respectively. The pulleys are triangularly disposed so that a straight line connecting the centers of pulleys 21 and 23 intersects the periphery of the drum to form a chord therewith, thus to cause the endless belt 20 in the absence of a check to engage a peripheral portion of tire 19 and be driven by the rotation of drum 13. As each incoming check is fed between the drum and the endless belt, the latter exerts a radial pressure against the back surface of the check to force it against the drum to receive driving impetus therefrom. The check is advanced as it is simultaneously tightly wrapped and bent around the curved stationary portion 14. A belt tensioning pulley 27 is journalled for rotation on one end of a lever 28 which is mounted for pivotal movement as at 29 between pulleys 21 and 23. A tension spring 30 is connected at one of its ends to stationary post 31 and is secured at its other end to the opposite end of the lever 28 to thereby exert a constant tension against the endless belt.

As seen in FIGURE 1, a pair of closely spaced parallel disposed plates 32 and 33 suitably secured to frame plate 10 constitute a guideway for the incoming checks. A guide plate 34, contiguous with plate 33, having a curved portion *34a* uniformly spaced along its length from the periphery of drum 13, constitutes a guideway in conjunction with the upper portion of the drum for the checks which are advanced therebetween. Ear portions 35 and 36, integral with plate 34, are suitably secured to pulley posts 24 and 25 to support the plate.

Referring now to FIGS. 2 and 3, the stationary portion 14 of the drum houses a magnetizing head 37 and a magnetic reading head 38, each mounted flush with the curved surface of stationary portion 14 and peripherally spaced from each other. Reading head 38, as herein illustrated, includes a magnetic core *38a* having a sensing gap *38b* and is inductively coupled with the winding *38c*, whereby the information sensed may be utilized as mentioned above. To provide registration of the ferromagnetic indicia *"d"* disposed along the lower edge of each check with the magnetizing and reading heads 37, 38, an annular edge guide 39 is suitably secured to shoulder portion *14a* of stationary portion 14. A method of reading the magnetizable ferromagnetic symbols or indicia *"d"* is described and claimed in the copending application for patents of Shaeffer et al., entitled "Voltage Comparison Circuits," Serial No. 789,983, filed January 29, 1959, and assigned to the same assignee as the present application.

A flexible electrically non-conductive, non-magnetic band 40 is wrapped partially around and is fixed to post 41 at one of its ends, with its other end passed around pulley 42 and connected to one end of a spring 43 which in turn is anchored to post 44. Post 41 and pulley 42 are positioned relative to stationary drum 14 so that a portion of the length of band 40 bears against the peripheral surface of stationary drum 14 including the reading head 38. Pulley 42 is journalled on post *42b* by bearings *42a*, the latter, as well as posts 41 and 44 being secured to frame plate 10. As the leading edges of the checks are gripped in the manner as previously described, each check is brought into close proximity first with magnetizing head 37 and is thereafter pulled between the reading head 38 and the flexible band 40. The aforementioned spring 43 affixed to band 40 and rotatable pulley 42 permits limited movement of the band in the direction of advancement of the check to thereby enable it to flex away from the stationary drum 14 to accommodate the thickness of the check and then to exert radial pressure against the back surface of the check so that indicia on its face surface is brought into close proximity with the reading head 38.

In order to readily separate the checks from the rotatable drum 13 and stationary portion 14, a finger plate member 45 is supported in upstanding relationship with frame plate 10 which together with plate 34 constitutes an exit guideway for the checks. For this purpose, as seen in FIG. 5, finger portions 46 extending along the upper portion of the front edge of plate 45 are received within the spaces between the annular flanges 17 of the rotatable drum 13, while stationary portion 14 is recessed as at 47 to receive finger 48 disposed along the lower front edge of plate 45. Since the extremities of the fingers lie radially inward of the periphery of the flanges 17 and the periphery of stationary portion 14, the checks are thus readily stripped from the drum and passed through the exit guideway.

Having thus described the preferred embodiment of the invention for purposes of illustration, it will be understood that the inventive concept may be embodied in other forms without departing from the scope of the invention.

I claim:

1. In a device for reading indicia contained on a driven sheet item, a rotatable drum having a portion of its surface of high coefficient of friction, an element movable at the same surface speed as said drum and co-operable with the frictional surface portion thereof for advancing a sheet item therebetween, said element and said drum gripping the sheet item therebetween without deforming it, a stationary member having a curved surface of the same radius as said drum and concentric therewith, a reading unit mounted in said stationary portion and flush with its curved surface, and band means mounted to conform to said curved surface in the vicinity of the reading unit and to permit passage of said sheet item therebetween, whereby engagement of said item by said rotatable drum and associated movable element pulls said item between said reading unit and said band under radial pressure of the latter to cause the indicia on the item to be brought into close proximity to the reading unit.

2. In a device for reading indicia contained on a driven sheet item, a rotatable drum, a movable element associated with the drum and driven thereby for advancing a sheet item therebetween, a stationary member having a curved surface of the same radius as said drum and concentric therewith, a reading unit mounted on said stationary member and flush with its curved surface, flexible band means adjacent said curved surface, and tension spring means urging said band means against said curved surface yet permitting limited movement of the latter in the direction of advancement of said item, whereby engagement of said item by said rotatable drum and associated movable element pulls said item between said reading unit and said band under radial pressure of the latter to cause the indicia on the item to be brought into close proximity to the reading unit.

3. A construction according to claim 2 wherein said band means is anchored at one of its ends to a stationary post and is connected at its other end to said spring tension means, and pulley means engaging said band intermediate its ends and disposed so that a portion of said band means conforms to the curved surface of said stationary member.

4. In a device for reading ferromagnetic indicia aligned across a driven sheet item comprising, a stationary member having a curved surface generated about a radius, a magnetizing head and a reading head each mounted in the curved surface of said stationary member and spaced from each other, band means mounted to conform to the curved surface adjacent said reading head to permit the passage of a sheet item therebetween, tension means urging said band means against each item passing therebetween so that the indicia thereon is brought into close proximity to said reading head, a movable drum journalled for rotation about the axis of said curved surface and having the same radius as the latter said drum having a portion of its surface of high coefficient of friction, and endless belt means cooperable with said surface portion of high coefficient of friction and driven by said movable drum whereby the leading edge of each item is engaged thereby and said item is pulled across said magnetizing head and between said reading head and said band means.

5. In a device for reading indicia contained on a driven sheet item, a stationary member having a curved surface, a reading unit mounted in said member and flush with said surface, a drum having the same radius as said curved surface and journalled for rotation in said stationary member about a common axis so that the periphery of said drum is aligned with said curved surface, said drum having at least one annular recess utilized for stripping said driven sheet item and a portion of its surface axially spaced from said recess having a high coefficient of friction, and means external to said drum and coacting with said axially spaced frictional portion to thereby force the item against the drum to receive driving impetus therefrom and to bring said indicia on the sheet item into close proximity to the reading unit.

6. In a device for reading indicia contained on a driven sheet item, a stationary member having a curved surface, a reading unit mounted in said member and flush with said surface, a drum having the same radius as said curved surface and journalled for rotation in said stationary member about a common axis so that the periphery of said drum is aligned with said curved surface, said drum having a plurality of annular flanges disposed along its upper portion and a tire having a high coefficient of friction disposed along its lower surface, said tire and flanges being of the same radius, means external to said drum and said stationary member for exerting radial pressure against an item fed between said external means and said drum and stationary member to thereby force the item against the tire and drum to receive driving impetus therefrom and to bring the indicia into close proximity to the reading unit, and finger means disposed between the spaces of said annular flanges for stripping the item from said rotating drum after the item has passed said reading unit.

7. In a device for reading indicia contained on a sheet item, a stationary member having a curved surface, a reading unit mounted in said member and flush with said surface, a drum having the same radius of curvature as the curved surface of said member and concentrically journalled for rotation therein with the periphery of said drum aligned with said curved surface, an edge guide extending along one side of the curved surface of said stationary member for registering the indicia on each item with said reading unit, said drum having a plurality of annular flanges and a surface portion having a high coefficient of friction, said surface portion and flanges having the same radius, band means mounted to conform to said curved surface to permit passage of said sheet item therebetween, a movable element mounted adjacent to the drum and movable in the same direction therewith whereby the sheet item fed therebetween is pulled between said reading unit and said band means under radial pressure of the latter to cause the indicia on the sheet item to be brought into close proximity to the reading unit, and finger means disposed between the spaces of said annular flanges for stripping the item from said rotating drum.

8. A construction according to claim 7 wherein said movable element comprises an endless flexible belt, and idler pulley means radially disposed about and adjacent said drum for supporting said belt and for causing the same to conform to said surface portion of high coefficient of friction.

9. In a device for reading indicia contained on a sheet item, a rotatable drum, a movable element associated with the drum for advancing a sheet item therebetween, a stationary member having a curved surface of the same radius of curvature as said drum and concentric therewith, a reading unit mounted within said stationary member and closely adjacent to its curved surface, flexible band means adjacent said curved surface, and spring tension means urging said band means against said curved surface yet permitting limited movement of the band means in the direction of advancement of said item, whereby engagement of said item by said rotatable drum and associated movable element pulls said item between said reading unit and said band means under radial pressure of the latter to cause the indicia on the item to be brought into close proximity to the reading unit.

10. A device for reading indicia on a sheet item, comprising in combination, a stationary member having a curved surface, a rotatable member having a surface of the same radius of curvature as said curved surface and mounted for rotation so that the respective curved surfaces of said stationary and rotatable members are in alignment one with the other, a signal transducing device mounted within the stationary member closely adjacent to the periphery of the curved surface thereof, means to grip said item to cause the same to conform to the curved surfaces of said stationary and rotatable members and to be simultaneously advanced past said transducing device while maintaining the item in close proximity to said transducing device to thereby sense the indicia on said item and means operable in concert with said rotatable member to strip said sheet item from said rotatable member.

11. A device for reading indicia on a sheet item, comprising in combination, a stationary member having a curved surface, a rotatable member having a surface of the same radius of curvature as said curved surface and mounted for rotation so that the respective curved surfaces of said stationary and rotatable members are in alignment one with the other, edge guide means carried by said stationary member and extending radially outwardly beyond said curved surface, a signal transducing device mounted within the stationary member closely adjacent to the periphery of the curved surface thereof, means cooperating with said rotatable member for gripping a sheet item to cause the same to conform to the curved surface of said stationary member and to be simultaneously advanced past said transducing device while maintaining the item in close proximity to said transducing device to thereby sense the indicia on said item, and means for releasing said item from conformity with said curved surface.

12. A device for reading indicia contained on a moving sheet item comprising, in combination, stationary means including a curved surface, edge guide means carried by said stationary means and extending radially outwardly beyond said curved surface, sensing means mounted within said stationary means and substantially flush with the periphery of said curved surface, a rotatable means having a curved surface of the same radius of curvature as that of the stationary means, means mounting the rotatable means adjacent to the stationary means with the axes of their respective curved surfaces in coincidence and journalling the rotatable means for rotation about this common axis, means for urging a sheet item into facing contact with said curved surfaces and cooperable with said rotatable means for simultaneously advancing the sheet item in edge contact with said guide means and across said sensing means for sensing the indicia on the item, and means to release said item from the rotating means including finger means operable in concert with said rotatable means to force a sheet item being advanced thereby out of contact therewith.

13. A device for reading indicia contained on a moving sheet item comprising, in combination, a stationary member having a curved surface, a reading unit mounted in said member flush with said curved surface, a drum having the same radius of curvature as the curved surface of said member and coaxially journalled for rotation on one side of the member with the periphery of said drum aligned with said curved surface, a flange on the stationary member extending along said curved surface on the side thereof opposite to the drum and serving as an edge guide for engagement by a side edge of a sheet item for registering indicia on the item with said reading unit, said drum having a peripheral portion with a high coefficient of friction and further having one or more annular grooves extending therearound, a flexible member positioned opposite to the reading unit, resilient means connected to the flexible member yieldingly urging the same into contact with the reading unit and with adjacent portions of the curved surface of the stationary member, a movable endless belt having a portion thereof in engagement with the frictional portion of the drum and being driven thereby when the drum is rotated and cooperating therewith to pull a sheet item between said reading unit and said flexible member to cause the indicia on the item to be brought into sensing proximity to the reading unit, and finger means entering said one or more grooves and operable in concert therewith to strip a sheet item out of contact with the rotating drum and the staionary member.

14. Apparaus for handling and reading a moving sheet item comprising, in combination, a stationary member having an external curved surface on a given radius, a sensing device mounted within the stationary member with a sensing part thereof located in proximity to the periphery of said curved surface, a rotatable drive member having a curved surface of substantially the same radius of curvature as the curved surface of the stationary member, means mounting the rotatable member alongside of the stationary member with their respective curved surfaces in coaxial relation and for rotation about the common axis of the two curved surfaces, a ring of frictional material encircling the rotatable member, movable means engaging the frictional ring to receive driving impetus therefrom and cooperating with the rotatable member for advancing a sheet item in a wrapped condition around said curved surfaces and across the sensing part of the sensing device, and means forming an exit guideway for receiving each such sheet item after passage across the sensing device including finger portions disposed along the curved surfaces for stripping each item therefrom.

15. In a device for reading indicia contained on a sheet item, a stationary member having a curved surface, a reading unit mounted in said member and flush with said surface, a drum having the same radius of curvature as the curved surface of said member and concentrically journalled for rotation therein with the periphery of said drum aligned with said curved surface, an edge guide extending along one side of the curved surface of said stationary member for registering the indicia on each item with said reading unit, said drum having a surface portion with a high coefficient of friction, band means mounted to conform to said curved surface to permit passage of said sheet item therebetween, and a movable element mounted adjacent to the drum and movable in the same direction therewith whereby the sheet item fed therebetween is pulled between said reading unit and said band means under radial pressure of the latter to cause the indicia on the sheet item to be brought into close proximity to the reading unit.

References Cited in the file of this patent

UNITED STATES PATENTS

| | | |
|---|---|---|
| 987,097 | McArdle | Mar. 14, 1911 |
| 1,385,468 | Pflanze | July 26, 1921 |
| 2,053,069 | Daly | Sept. 1, 1936 |

FOREIGN PATENTS

| | | |
|---|---|---|
| 213,572 | Australia | Mar. 7, 1958 |